US009685876B2

(12) United States Patent
Liu et al.

(10) Patent No.: US 9,685,876 B2
(45) Date of Patent: Jun. 20, 2017

(54) RESONANT CONVERTER WITH CAPACITIVE MODE DETECTION AND ASSOCIATED DETECTION METHOD

(71) Applicant: Hangzhou MPS Semiconductor Technology Ltd., Hangzhou (CN)

(72) Inventors: Bairen Liu, Hangzhou (CN); Licheng Sheng, Hangzhou (CN); Bo Yu, Hangzhou (CN); Hongqiang Qin, Hangzhou (CN); Qiming Zhao, Hangzhou (CN); Naixing Kuang, Hangzhou (CN); Eric Yang, Saratoga, CA (US)

(73) Assignee: Hangzhou MPS Semiconductor Technology Ltd., Hangzhou (CN)

( * ) Notice: Subject to any disclaimer, the term of this patent is extended or adjusted under 35 U.S.C. 154(b) by 0 days.

(21) Appl. No.: 14/974,340

(22) Filed: Dec. 18, 2015

(65) Prior Publication Data
US 2016/0190945 A1  Jun. 30, 2016

(30) Foreign Application Priority Data
Dec. 31, 2014  (CN) .......................... 2014 1 0855769

(51) Int. Cl.
*H02M 3/335* (2006.01)
*H02M 1/32* (2007.01)
(Continued)

(52) U.S. Cl.
CPC ......... *H02M 3/33546* (2013.01); *H02M 1/32* (2013.01); *H02M 3/337* (2013.01);
(Continued)

(58) Field of Classification Search
CPC .......... H02M 3/315; H02M 7/48; H02M 3/28; H02M 3/335; H02M 3/33507;
(Continued)

(56) References Cited

U.S. PATENT DOCUMENTS 7,212,415 B2 * 5/2007 Osaka ............... H02M 3/33569
363/21.02
8,737,092 B2 * 5/2014 Adragna ............. H02M 3/3372
363/21.02
(Continued)

OTHER PUBLICATIONS

U.S. Appl. No. 14/857,405, filed Sep. 17, 2015, 45 pages.
U.S. Appl. No. 14/859,070, filed Sep. 18, 2015, 42 pages.

*Primary Examiner* — Adolf Berhane
(74) *Attorney, Agent, or Firm* — Perkins Coie LLP

(57) ABSTRACT

A method of capacitive mode detection is used in a resonant converter. The resonant converter has a square wave generator having a first switch and a second switch, a resonant network, an isolated transformer having a primary winding and a second winding, and a rectifier network providing an output DC voltage for a load. The method of capacitive mode detection includes: detecting a voltage of the secondary winding and generating a voltage detection signal; detecting an output DC voltage of the rectifier network and generating a voltage detecting threshold; comparing the voltage detection signal with the voltage detection threshold when either of the first and the second switches is turned OFF; generating a flag signal indicating whether the resonant converter enters into a capacitive mode based on the comparison result.

19 Claims, 12 Drawing Sheets

(51) Int. Cl.
*H02M 3/337* (2006.01)
*H02M 1/00* (2006.01)

(52) U.S. Cl.
CPC .. *H02M 3/3376* (2013.01); *H02M 2001/0058* (2013.01); *Y02B 70/1433* (2013.01); *Y02B 70/1491* (2013.01); *Y02P 80/112* (2015.11)

(58) Field of Classification Search
CPC ......... H02M 3/33523; H02M 3/33569; H02M 7/53871; H02M 7/515; H02M 7/53; H02M 2007/4815
USPC .................. 363/20, 21.02, 21.03, 78, 95, 97
See application file for complete search history.

(56) References Cited

U.S. PATENT DOCUMENTS

| | | | |
|---|---|---|---|
| 9,525,358 B2* | 12/2016 | Jin | H02M 1/38 |
| 2009/0244934 A1* | 10/2009 | Wang | H02M 3/33592 363/21.06 |
| 2009/0251929 A1* | 10/2009 | Choi | H02M 1/08 363/21.02 |
| 2014/0146577 A1* | 5/2014 | Uno | H02M 3/33561 363/21.02 |
| 2015/0023062 A1* | 1/2015 | Hyugaji | H02M 3/33592 363/16 |
| 2015/0333634 A1* | 11/2015 | Yoshida | H02M 3/33576 363/21.03 |
| 2016/0087544 A1* | 3/2016 | Jin | H02M 1/32 363/21.02 |
| 2016/0352234 A1* | 12/2016 | Imai | H02M 3/158 |

* cited by examiner

RESONANT CONVERTER WITH CAPACITIVE MODE DETECTION AND ASSOCIATED DETECTION METHOD

CROSS-REFERENCE TO RELATED APPLICATION

This application claims the benefit of CN application No. 201410855769.1, filed on Dec. 31, 2014, and incorporated herein by reference.

TECHNICAL FIELD

The present invention refers to electrical circuit, to be more specific but not exclusively refers to resonant converters with capacitive mode detection.

BACKGROUND

FIG. 1 illustrates a prior art half-bridge LLC resonant converter 100. The resonant converter 100 comprises a square wave signal generator 101, a resonant network 102, an isolated transformer T and a rectifier network 103. The square wave signal generator 101 is built as a half-bridge type and comprises a high-side switch M1 and a low-side switch M2. The square wave signal generator 101 is configured to convert an input DC voltage $V_{IN}$ into a square wave signal Vd by driving the high-side switch M1 and the low-side switch M2. The resonant network 102 receives the square wave signal Vd and is coupled to the load through the rectifier network 103 to provide an output DC voltage Vo.

In prior art, the resonant converter with primary side control is configured to detect whether a capacitive mode or an inductor mode based on phase difference between a primary input current Ip flowing into the resonant network 102 and the square wave signal Vd applied in the resonant network 102. FIGS. 2A and 2B illustrate schematic waveform diagrams of the resonant converter 100 in the inductor mode and capacitive mode, respectively. As shown in FIG. 2A, the primary input current Ip lags the square wave signal Vd, the resonant converter 100 works in the inductive mode, the high-side switch M1 can be turned ON at zero voltage. As shown in FIG. 2B, the primary input current Ip leads the square wave signal Vd, the resonant converter 100 works in the capacitive mode, the body diode of the high-side switch M1 presents reverse-recovery because of the hard switching, that causes high power dissipation. Furthermore, the slow reverse recovery may allow severe shoot-through of the high-side switch M1 and the low-side switch M2, resulting in high current spikes and causing the switches to fail. However, the prior mode detection method is hard to apply in the resonant converter with a secondary side control.

SUMMARY

The embodiments of the present invention are directed to a resonant converter comprising a square wave generator, a resonant network, an isolated transformer, a rectifier network, a voltage detection circuit, a capacitive mode judge circuit and a switching frequency controller. The square wave generator comprises a first switch and a second switch controlled by a first and a second control signals respectively, the square wave generator is configured to convert an input DC voltage into a square wave signal according to switching operations of the two switches. The resonant network is coupled to the square wave generator to receive the square wave signal. The isolated transformer has a primary winding coupled to the resonant network and a secondary winding. The rectifier network is coupled to the secondary winding and provides an output DC voltage for a load at its output terminal. The voltage detection circuit is coupled to the secondary winding to detect a voltage of the secondary winding and provides a voltage detection signal. The voltage detection circuit is further coupled to the output terminal of the rectifier network to receive the output DC voltage and provides a voltage detection threshold. The capacitive mode judge circuit compares the voltage detection signal with the voltage detection threshold when either of the first switch and the second switch is turned OFF, and generates a flag signal indicating whether the resonant converter enters into a capacitive mode. The switching frequency controller is configured to generate the first and the second control signals. The switching frequency controller increases the frequency of the first and the second control signals when the resonant converter enters into capacitive mode.

BRIEF DESCRIPTION OF THE DRAWINGS

Non-limiting and non-exhaustive embodiments are described with reference to the following drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The phrase "couple" includes direct connection and indirect connection. Indirect connection includes connection through conductor which has resistance and/or parasitic parameters such as inductance and capacitance, or connection through diode, and so on.

Figure 1:
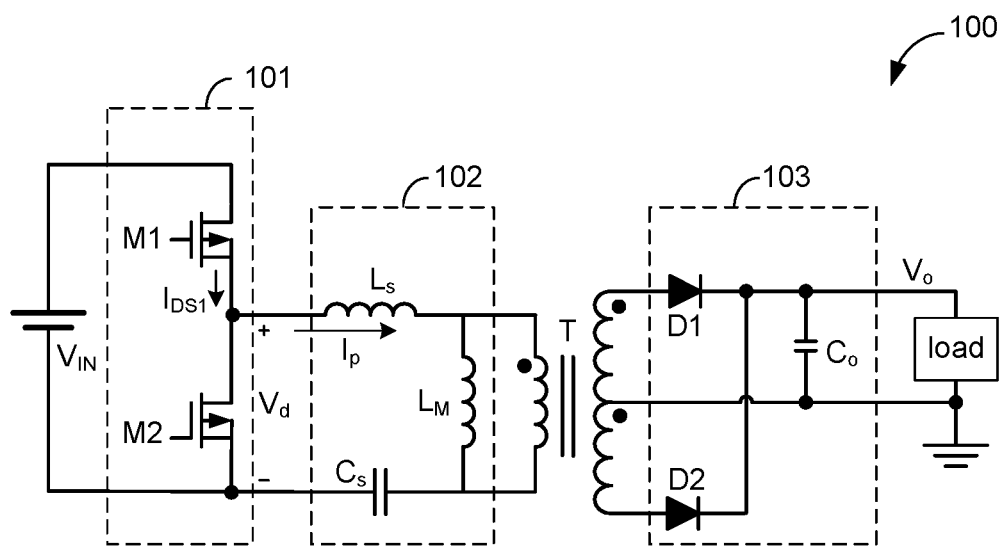
FIG. 1 illustrates a prior art half-bridge LLC resonant converter 100.
Figure 2A:
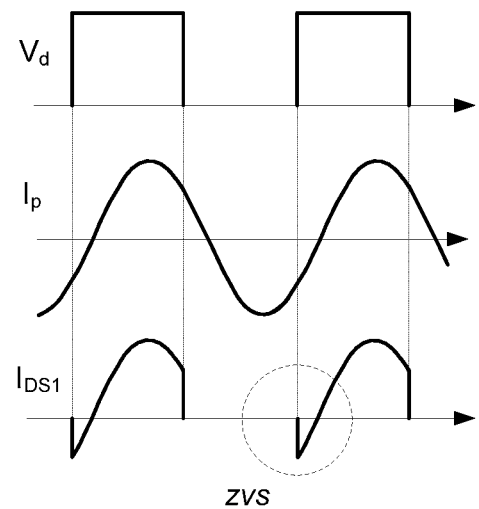
FIGS. 2A and 2B illustrate schematic waveform diagrams of the resonant converter 100 in the inductor mode and capacitive mode, respectively.
Figure 2B:
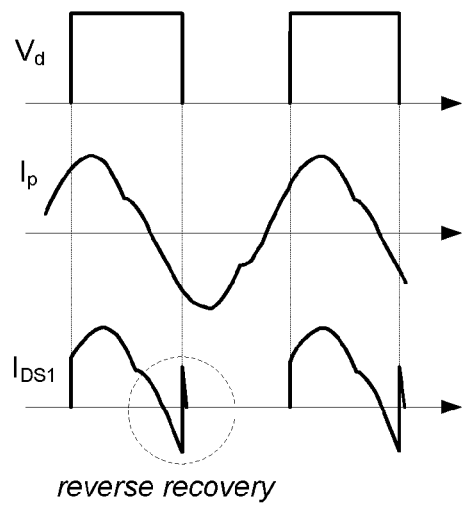
Figure 3:
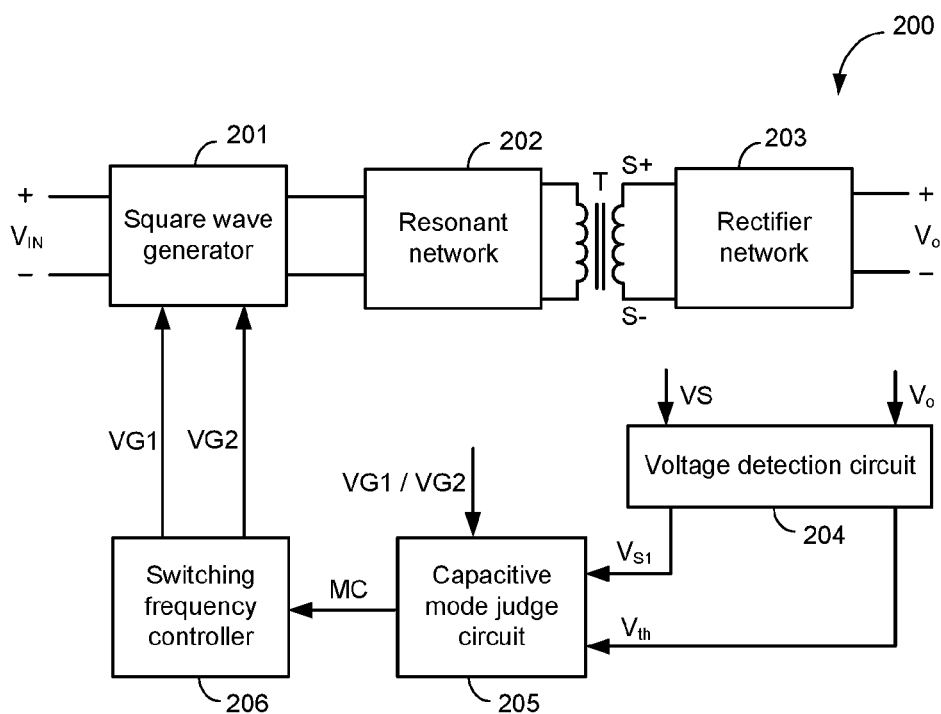
FIG. 3 illustrates a block diagram of a resonant converter 200 with capacitive mode detection, according to an embodiment of the present invention.

FIG. 3 illustrates a block diagram of a resonant converter 200 with capacitive mode detection according to an embodiment of the present invention. The resonant converter 200 comprises a square wave signal generator 201, a resonant network 202, an isolated transformer T having a primary winding and a secondary winding, a rectifier network 203, a capacitive mode detection circuit and a switching frequency controller 206. The square wave signal generator 201 comprises a high-side switch and a low-side switch which are controlled respectively by a first control signal VG1 and a second signal VG2 with 50% duty cycle for each control signal. The square wave signal generator 201 is configured to convert an input DC voltage $V_{IN}$ into a square wave signal Vd by controlling the first control signal VG1 and the second control signal VG2. The resonant network 202 is coupled to the square wave signal generator 201 to receive the square wave signal Vd and is coupled to the primary winding of the isolated transformer T. The rectifier network 203 is coupled to the secondary winding of the isolated transformer T to provide an output DC voltage Vo for a load at its output terminal.

The capacitive mode detection circuit comprises a voltage detection circuit 204 and a capacitive mode judge circuit 205. The voltage detection circuit 204 is coupled to the secondary winding of the isolated transformer T to detect a voltage $V_S$ of the secondary winding and is configured to provide a voltage detection signal $V_{S1}$. The voltage detection circuit 204 is further coupled to the output terminal of the rectifier network 203 to receive the output DC voltage Vo and provides a voltage detection threshold $V_{th}$ based on the output DC voltage Vo. The capacitive mode judge circuit 205 compares the voltage detection signal $V_{S1}$ with the voltage detection threshold $V_{th}$ when either of the first switch and the second switch is turned OFF and generates a flag signal MC indicating whether the resonant converter 200 enters into a capacitive mode based on the comparison result.

As shown in FIG. 3, the secondary winding of the isolated transformer T has a first terminal S+ and a second terminal S−. In one embodiment, the voltage $V_S$ of the secondary winding may be the voltage of the first terminal S+ of the secondary winding. In another embodiment, the voltage $V_S$ of the secondary winding may be the voltage of the second terminal S+ of the secondary winding or the difference between the voltage of the first terminal S+ and second terminal S− of the secondary winding.

The switching frequency controller 206 is configured to provide the first control signal VG1 and the second control signal VG2. The switching frequency controller 206 is further coupled to the capacitive mode judge circuit 205 to receive the flag signal MC. When the flag signal MC indicates the resonant converter 200 works in the inductive mode, the switching frequency of the resonant converter 200, i.e. the frequency of the first control signal VG1 or the second control signal VG2, is controlled by the switching frequency controller 206 based on a feedback signal dependent on the output DC voltage Vo. When the flag signal MC indicates the resonant converter 200 enters into the capacitive mode, the frequency of the first control signal VG1 and the second control signal VG2 is increased by the switching frequency controller 206 in order to make the resonant converter 200 returns the inductive mode from the capacitive mode quickly.

Figure 4:
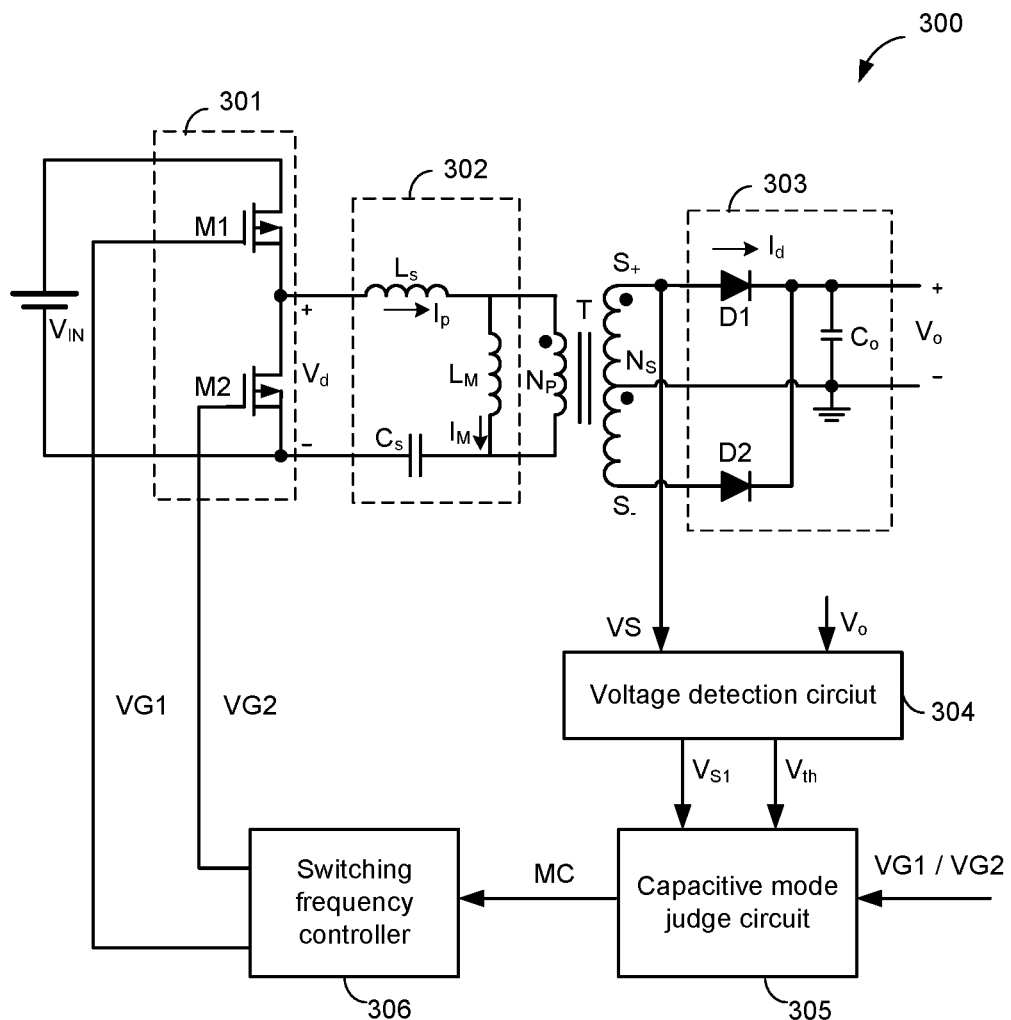
FIG. 4 illustrates a circuit diagram of a resonant converter 300 with capacitive mode detection, according to an embodiment of the present invention.

FIG. 4 illustrates a circuit diagram of a resonant converter 300 with capacitive mode detection, according to an embodiment of the present invention. As shown in FIG. 4, the resonant converter 300 comprises a square wave signal generator 301, a resonant network 302, an isolated transformer T having a primary winding Np and secondary winding Ns, a rectifier network 303, a capacitive mode detection circuit and a switching frequency controller 306.

In the embodiment shown in FIG. 4, the square wave signal generator 301 is built as half-bridge type and comprises a high-side switch M1 and a low-side switch M2 which are controlled respectively by a first control signal VG1 and a second signal VG2 with 50% duty cycle for each control signal. The square wave signal generator 301 is configured to convert an input DC voltage $V_{IN}$ into a square wave signal Vd by controlling the two complementary control signals VG1 and VG2. In another embodiment, the square wave signal generator 301 may be built as full-bridge type.

The resonant network 302 comprises a capacitor $C_S$, a first inductor $L_S$ and a second inductor $L_M$, wherein the second inductor $L_M$ is coupled to the primary winding of the isolated transformer T in parallel, the second inductor $L_M$ is the magnetizing inductance. The resonant converter 300 has a first resonant frequency $f_{r1}$ and a second resonant frequency $f_{r2}$. The first resonant frequency $f_{r1}$ is determined by the resonance between the capacitor $C_S$ and the first inductor $L_S$, the second resonant frequency $f_{r2}$ is determined by the resonance between the capacitor $C_S$, the first inductor $L_S$ and the second inductor $L_M$, which can be expressed as:

$$f_{r1} = \frac{1}{2\pi\sqrt{L_s C_s}}, f_{r2} = \frac{1}{2\pi\sqrt{(L_s + L_M)C_s}}$$

In the embodiment shown in FIG. 4, the rectifier network 303 is coupled to the secondary winding Ns and comprises a full-wave rectifier circuit and an output capacitor Co. The full-wave rectifier circuit comprises a first rectifying diode D1 and a second rectifying diode D2. The anode of the first rectifying diode D1 is coupled to the first terminal S+ of the secondary winding, the anode of the second rectifying diode D2 is coupled to the second terminal S− of the secondary winding. The output capacitor Co has s first terminal and a second terminal, wherein the first terminal is coupled to the cathode of the first rectifying diode D1, the second terminal is coupled to a secondary ground. In other embodiments, the rectifier network 303 may be configured in other structure.

The capacitive mode detection circuit comprises a voltage detection circuit 304 and a capacitive mode judge circuit 305. In the embodiment shown in FIG. 4, the voltage detection circuit 304 is coupled to the first terminal S+ of the secondary winding and detects the voltage $V_{S+}$ of the first terminal S+ of the secondary winding, and provides the voltage $V_{S+}$ as the voltage detection signal $V_{S1}$.

The resonant converter 300 has three types of operation considering the switching frequency and the load: (1) the switching frequency is higher than the first resonant frequency $f_{r1}$ (2) the switching frequency is lower than the first resonant frequency $f_{r1}$ and higher than the second frequency $f_{r2}$, the working mode is determined by the load; (3) the switching frequency is lower than the second resonant frequency $f_{r2}$.

Figure 5A:
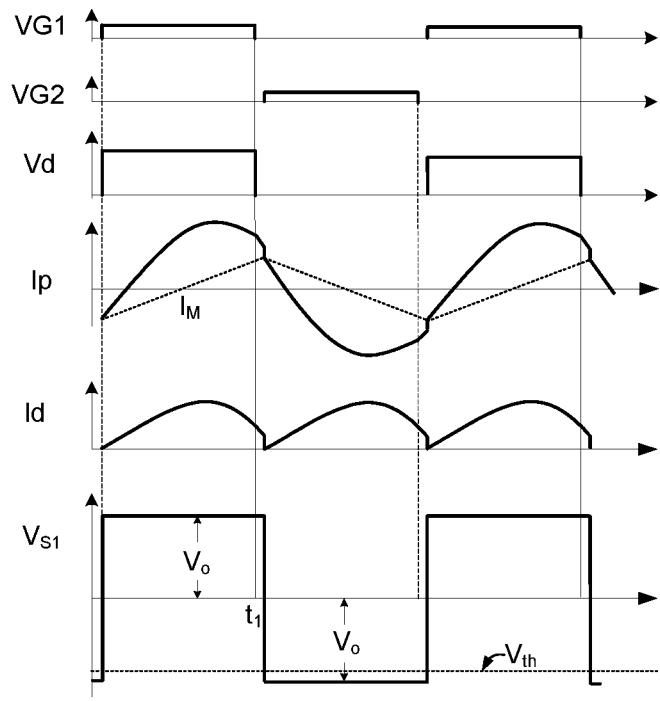
FIGS. 5A-5C illustrate working waveform diagrams for the resonant converter 300 shown in FIG. 4 under different operation types, according to an embodiment of the present invention.
Figure 5B:
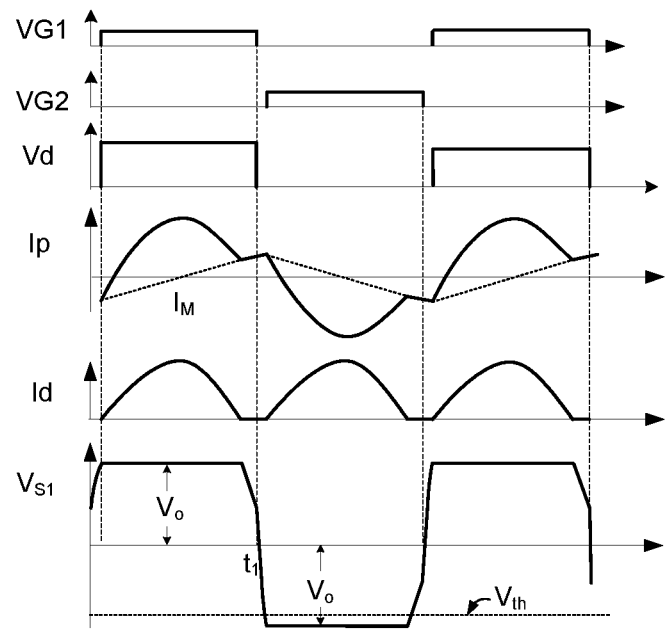
Figure 5C:
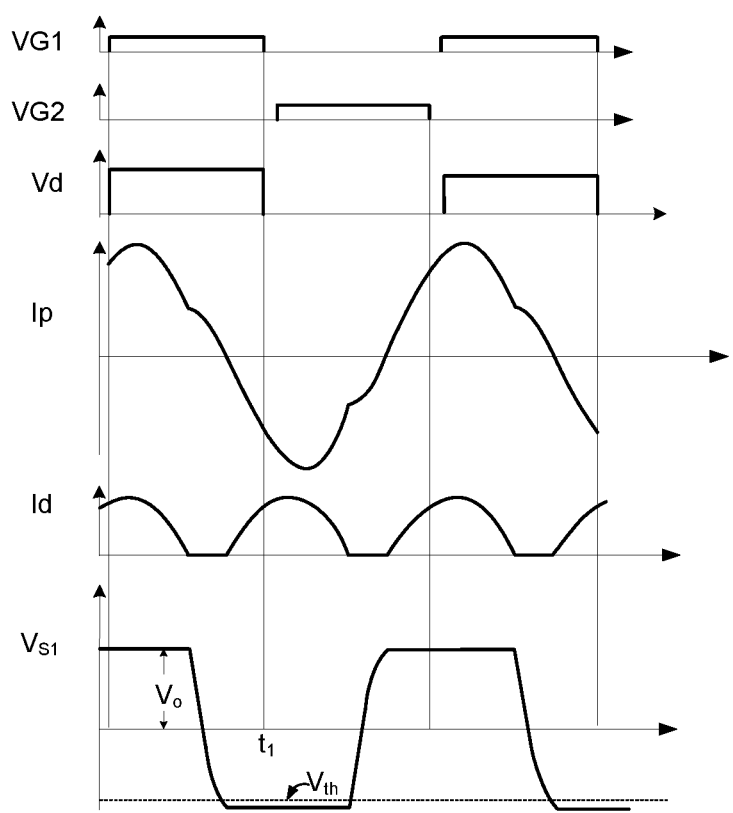

FIGS. 5A-5C illustrate working waveform diagrams for the resonant converter 300 shown in FIG. 4 under different operation types, according to an embodiment of the present invention. In detail, FIGS. 5A-5C illustrate in turn the waveforms of the first control signal VG1, the second control signal VG2, the square wave signal Vd, the primary input current Ip, the current $I_M$ flowing the second inductor $L_M$, the secondary input current Id and the voltage detection signal $V_{S1}$ respectively, in different operation types. Wherein the first control signal VG1 and the second control signal VG2 are used to turn ON/OFF the high-side switch M1 and the low-side switch M2 respectively. Normally, a popular method used to prevent cross conduction of the high-side switch M1 and the low-side switch M2 is to provide a dead time between the first control signal VG1 and the second control signal VG2.

In the embodiment shown in FIGS. 5A-5C, the voltage detection signal $V_{S1}$ is the voltage $V_S$ of the first terminal S+ of the secondary winding. At t1 time, the high-side switch M1 is turned OFF, the capacitive mode judge circuit 305 compares the voltage detection signal $V_{S1}$ with the voltage detection threshold $V_{th}$ to judge the working mode of the resonant converter 300. The judge law is: if $V_{S1} > V_{th}$ at t1 time, the capacitive mode judge circuit 305 provides a flag signal MC having a first level that indicates the resonant converter 300 works in the inductive mode. Otherwise, the flag signal MC has a second level that indicates the resonant converter 300 works in the capacitive mode.

In detail, as shown in FIG. 5A, the switching frequency of the resonant converter 300 is higher than the first resonant frequency $f_{r1}$. The primary input current Ip lags the square wave signal Vd, the resonant converter 300 works in the inductive mode. According to the previous judge law, the voltage detection signal $V_{S1}$ is larger than the voltage detection threshold $V_{th}$ at t1 time, so the flag signal MC has the first level.

As shown in FIG. 5B, the switching frequency of the resonant converter 300 is lower than the first resonant frequency $f_{r1}$ and higher than the second resonant frequency $f_{r2}$. The primary input current Ip lags the square wave signal Vd, the resonant converter 300 works the in inductive mode. According to the previous judge law, the voltage detection signal $V_{S1}$ is larger than the voltage detection threshold $V_{th}$ when the high-side switch M1 is turned OFF, so the flag signal MC has the first level.

As shown in FIG. 5C, the switching frequency of the resonant converter 300 is lower than the second resonant frequency $f_{r2}$. The primary input current Ip leads the square wave signal Vd, the resonant converter 300 works in the capacitive mode. According to the previous judge law, the voltage detection signal $V_{S1}$ is less than the voltage detection threshold $V_{th}$ when the high-side switch M1 is turned OFF, so the flag signal MC has the second level.

In the embodiments shown in FIGS. 5A-5C, the voltage detection signal $V_{S1}$ is the voltage $V_S$ of the first terminal S+ of the secondary winding. In another embodiment, the voltage detection signal $V_{S1}$ is the voltage $V_{S-}$ of the first terminal S- of the secondary winding. For simplicity, the operations of the above embodiments can be listed in the following table with the reference FIGS. 5A-5C.

| switching frequency $f_s$ | | $V_{S1}$ | judge time | $V_{th}$ | judge law | MC |
|---|---|---|---|---|---|---|
| $f_s > f_{r1}$ | eg1 | $V_{S+}$ | t1 | −0.95 Vo | $V_{S1} > V_{th}$? | First level |
| $f_{r2} < f_s < f_{r1}$ | | | | | | First level |
| $f_s < f_{r2}$ | | | | | | Second level |
| $f_s > f_{r1}$ | eg2 | $V_{S-}$ | t1 | 0.95 Vo | $V_{S1} < V_{th}$? | First level |
| $f_{r2} < f_s < f_{r1}$ | | | | | | First level |
| $f_s < f_{r2}$ | | | | | | Second level |

In the two embodiments shown in above table, based the comparison result of the voltage detection signal $V_{S1}$ and the voltage detection threshold $V_{th}$, the capacitive or inductive mode of the resonant converter can be detected. In different embodiments, both the voltage detection threshold $V_{th}$ and the judge law are different. The voltage detection threshold $V_{th}$ is dependent on the voltage detection signal $V_{S1}$ and the judge law.

Figure 6:
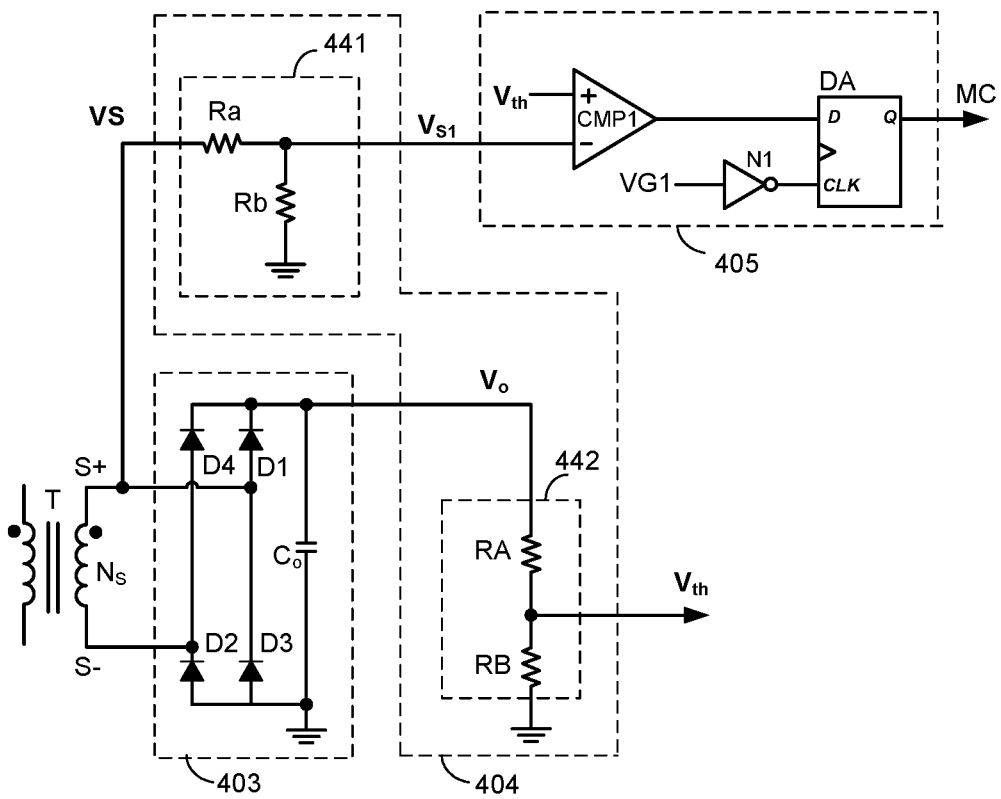
FIG. 6 illustrates a circuit diagram of a capacitive mode detection circuit used in the resonant converter 300 shown in FIG. 4 according to an embodiment of the present invention.

FIG. 6 illustrates a circuit diagram of a capacitive mode detection circuit used in the resonant converter 300 shown in FIG. 4 according to an embodiment of the present invention. In the embodiment shown in FIG. 6, the rectifier network 403 comprises a bridge rectifier circuit and an output capacitor Co. The bridge rectifier circuit comprises four rectifying diode D1-D4, wherein the anode of the first rectifying diode D1 and the cathode of the third rectifying diode D3 are coupled to the first terminal S+ of the secondary winding, the cathode of the second diode D2 and the anode of the fourth rectifying diode D4 are coupled to the second terminal S- of the secondary winding. The output capacitor Co has a first terminal and a second terminal, wherein the first terminal is coupled to cathode of the first rectifying diode D1 and the cathode of the fourth rectifying diode D4, the second terminal is coupled to the anode of the second rectifying diode D2, the anode of the third rectifying diode D3 and a secondary ground.

As shown in FIG. 6, the capacitive mode detection circuit comprises a voltage detection circuit 404 and a capacitive mode judge circuit 405. The voltage detection circuit 404 is coupled to the first terminal S+ of the secondary winding to detect the voltage $V_S$ of the first terminal of the secondary winding. The voltage detection circuit 404 is further coupled to the output terminal of the rectifier network 403 to receive the output DC voltage Vo and provides a voltage detection threshold $V_{th}$ based on the output DC voltage Vo. The voltage detection circuit 404 comprises a first voltage divider 441 and the second voltage divider 442. The first voltage divider 441 is coupled in parallel between the first terminal S+ of the secondary winding and the secondary ground, and comprises the resistors Ra and Rb, the connection of which is shown in FIG. 6. The first voltage divider 441 is configured to provide the voltage detection signal $V_{S1}$ at its output terminal. The second voltage divider 442 is coupled to the output capacitor Co in parallel and comprises the resistors RA and RB, the connection of which is shown in FIG. 6. The second voltage divider 442 is configured to provide the voltage detection threshold $V_{th}$ at its output terminal As shown in FIG. 6, The capacitive mode judge circuit 405 comprises a first comparator CMP1, a first inverter N1 and a first rising edge D flip-flop DA. The first comparator CMP1 has a non-inverting input terminal, an inverting input terminal and an output terminal, wherein the non-inverting input terminal is configured to receive the voltage detection threshold $V_{th}$, the inverting input terminal is configured to receive the voltage detection signal $V_{S1}$, the first comparator CMP1 provides a first comparison signal at the output terminal. The first inverter N1 has an input terminal and an output terminal, wherein the input terminal is coupled to receive the first control signal VG1 and provides the complementary signal of the first control signal VG1 at the output terminal. The first rising edge D flip-flop DA has an input reference terminal, an input clock terminal and an output terminal, wherein the input reference terminal is configured to receive the first comparison signal, the input clock terminal is coupled to the output terminal of the first inverter N1, the first rising edge D flip-flop DA provides the flag signal MC at the output terminal.

In the embodiment of shown in FIG. 6, the first voltage divider 441 is configured to provide the voltage detection signal $V_{S1}$, wherein $V_{S1}=K*V_S$, K is the division factor of the first voltage divider 441. The voltage detection threshold $V_{th}$ is set to a small signal that is slightly higher than zero. In one embodiment, the voltage detection threshold $V_{th}$ is set to 0.05*K*Vo, wherein 0.05*K equals a division factor of the second voltage divider 442.

Figure 7:
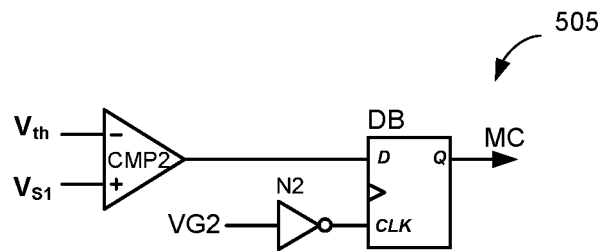
FIG. 7 illustrates a circuit diagram of a capacitive mode detection circuit used in the resonant converter 300 shown in FIG. 4 according to another embodiment of the present invention.

FIG. 7 illustrates a circuit diagram of a capacitive mode detection circuit used in the resonant converter 300 shown in FIG. 4 according to another embodiment of the present invention. The capacitive mode judge circuit 405 shown in FIG. 6 and that shown in FIG. 7 has different judge time. the former is turn-OFF time of the high-side switch M1, however, the latter is turn-OFF time of the low-side switch M2.

In the embodiment shown in FIG. 7, the capacitive mode judge circuit 505 comprises a second comparator CMP2, a second inverter N2 and a second rising edge D flip-flop DB. The second comparator CMP2 has a non-inverting input terminal, an inverting input terminal and an output terminal, wherein the non-inverting input terminal is configured to receive the voltage detection threshold $V_{th}$, the inverting input terminal is configured to receive the voltage detection signal $V_{S1}$, the second comparator CMP2 provides a second comparison signal at the output terminal. The second inverter N2 has an input terminal and an output terminal, wherein the input terminal is coupled to receive the second control signal VG2 and provides the complementary signal of the second control signal VG2 at the output terminal. The second rising edge D flip-flop DB has an input reference terminal, an input clock terminal and an output terminal, wherein the input reference terminal is configured to receive the second comparison signal, the input clock terminal is coupled to the output terminal of the second inverter N2, the second rising edge D flip-flop DB provides the flag signal MC at the output terminal. In the embodiment shown in FIG. 7, the voltage detection threshold $V_{th}$ is slightly lower than K*Vo, for example, 0.95*K*Vo, wherein 0.95*K is the division factor of the second voltage divider 442. The operations according to the above embodiments can be listed in the following table with the reference FIGS. 6~7.

| switching frequency $f_s$ | $V_{S1}$ | judge time | $V_{th}$ | judge law | MC |
|---|---|---|---|---|---|
| $f_s > f_{r1}$ | eg3 | $V_{S+}$ | t1 | 0.05 * K * Vo | $V_{S1} > V_{th}$? | 0 |
| $f_{r2} < f_s < f_{r1}$ | | | | | | 0 |
| $f_s < f_{r2}$ | | | | | | 1 |
| $f_s > f_{r1}$ | eg4 | $V_{S-}$ | t2 | 0.95 * K * Vo | $V_{S1} < V_{th}$? | 0 |
| $f_{r2} < f_s < f_{r1}$ | | | | | | 0 |
| $f_s < f_{r2}$ | | | | | | 1 |

Figure 8A:
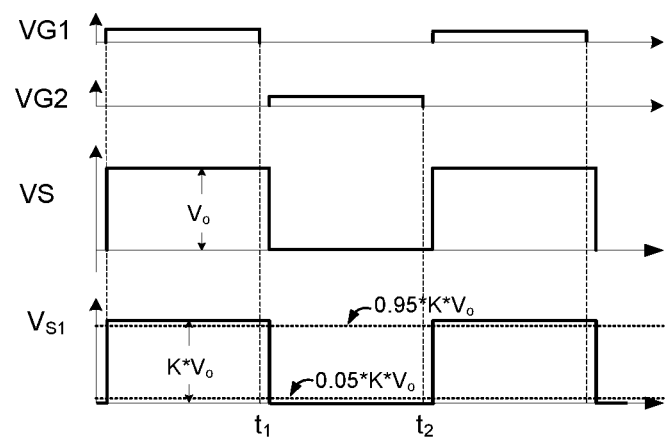
FIGS. 8A-8C illustrate working waveform diagrams for the embodiments with the reference in FIGS. 6 and 7 under different operation types, according to an embodiment of the present invention.
Figure 8B:
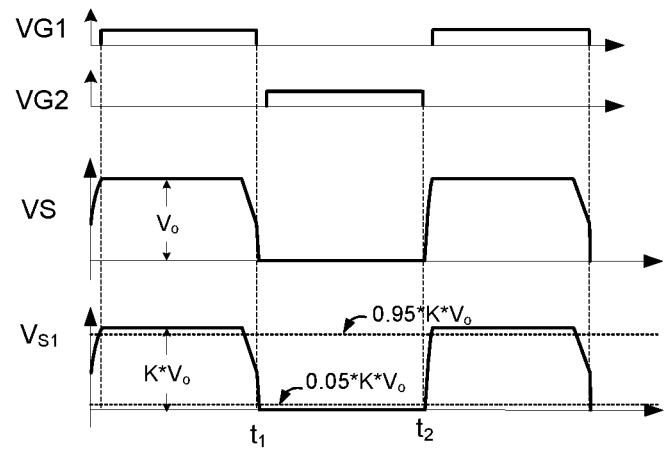
Figure 8C:
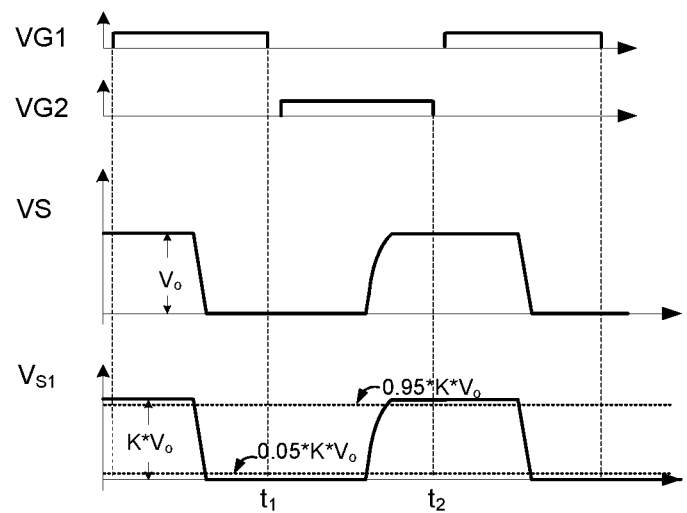

FIGS. 8A~8C illustrate working waveform diagrams for the embodiments with the reference in FIGS. 6 and 7 under different operation types, according to an embodiment of the present invention. In detail, FIGS. 8A~8C illustrate in turn the waveforms of the first control signal VG1, the second control signal VG2, the voltage of the secondary winding VS and the voltage detection signal $V_{S1}$ respectively, in different operation types. The voltage threshold $V_{th}$ is various with the voltage detection signal $V_{S1}$, the judge law and judge time.

Figure 9:
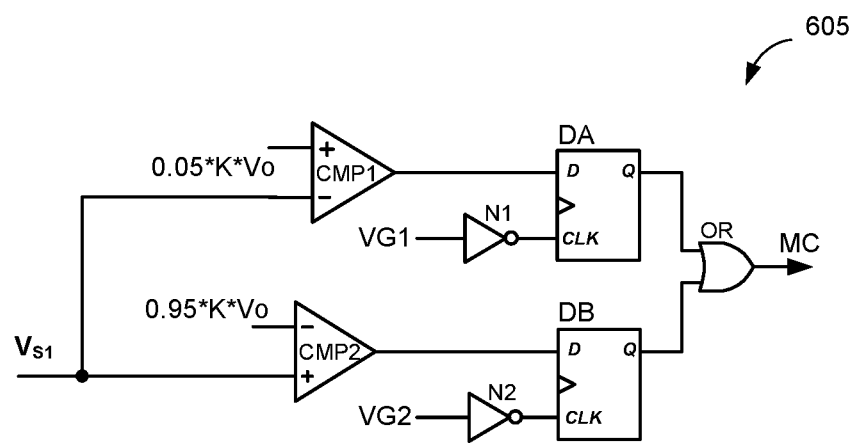
FIG. 9 illustrates a circuit diagram of a capacitive mode detection circuit used in the resonant converter 300 shown in FIG. 4 according to yet another embodiment of the present invention.

FIG. 9 illustrates a circuit diagram of a capacitive mode detection circuit used in the resonant converter 300 shown in FIG. 4 according to yet another embodiment of the present invention. The embodiment shown in FIG. 9 is the combination of the capacitive mode judge circuit 405 and the capacitive mode judge circuit 505, its operation is omitted for clarity.

Figure 10:
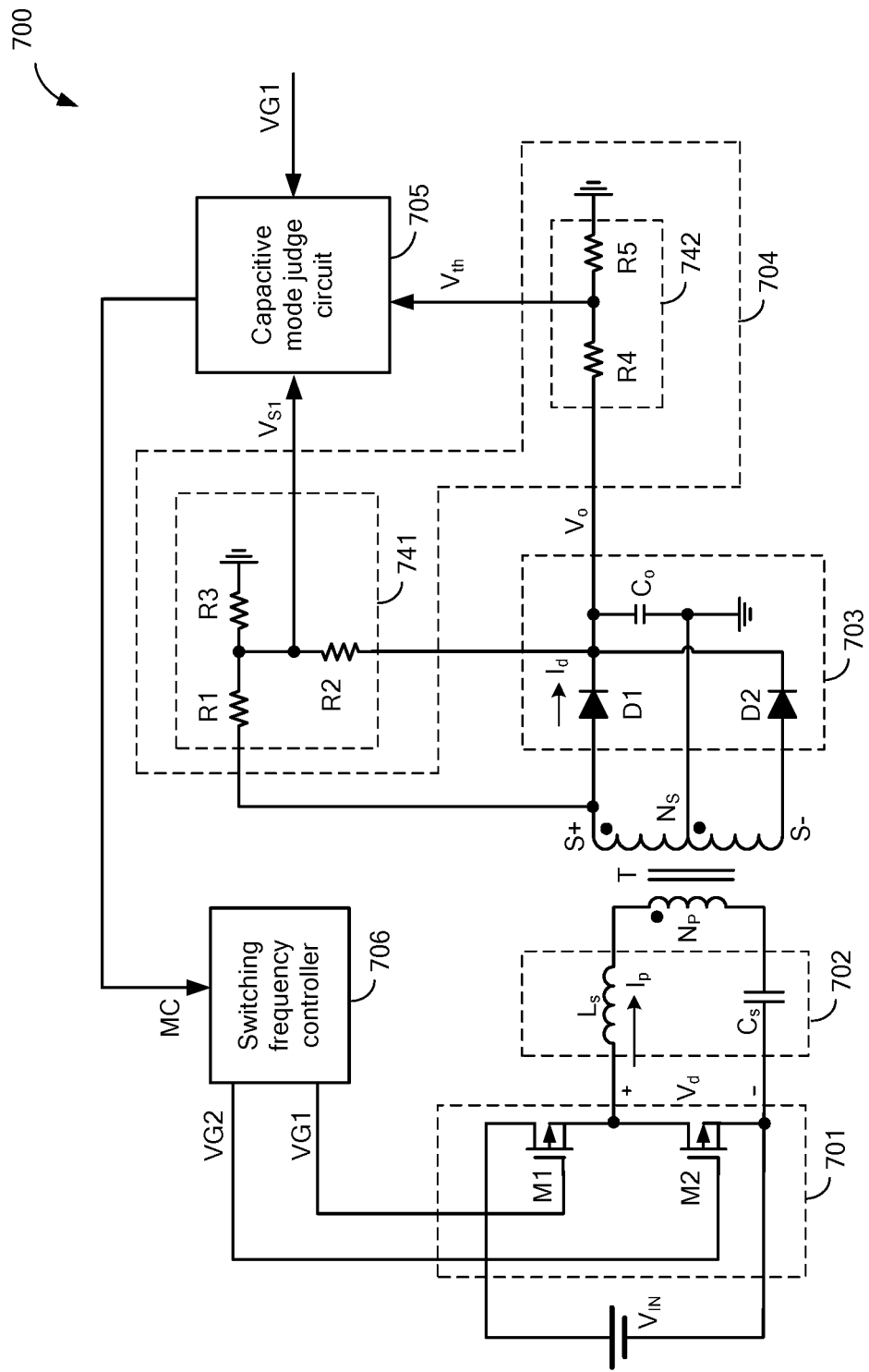
FIG. 10 illustrates a circuit diagram of a resonant converter 700 with capacitive mode detection, according to an embodiment of the present invention.

FIG. 10 illustrates a circuit diagram of a resonant converter 700 with capacitive mode detection, according to an embodiment of the present invention. The resonant converter 700 comprises a square wave signal generator 701, a resonant network 702, an isolated transformer T having a primary winding and a secondary winding, a rectifier network 703, a capacitive mode detection circuit and a switching frequency controller 706.

In the embodiment shown in FIG. 10, the square wave signal generator 701 is built as half-bridge type and comprises a high-side switch M1 and a low-side switch M2 which are controlled respectively by a first control signal VG1 and a second signal VG2 with 50% duty cycle for each control signal. The resonant network 702 is coupled to the output terminal of the square wave signal generator 701 to receive the square wave signal Vd. The resonant network 702 comprises a series resonant network consisting of a capacitor $C_S$ and a first inductor $L_S$, and the resonant frequency $f_r$ of the resonant converter 700 is determined by:

$$f_r = \frac{1}{2\pi\sqrt{L_s C_s}}$$

As shown in FIG. 10, the secondary winding of the isolated transformer T has a first terminal S+, a second terminal S− and a centered tap coupled to the ground. The rectifier network 703 comprises a full-wave rectifier circuit and an output capacitor Co.

In the embodiment shown in FIG. 10, the capacitive mode detection circuit comprises a voltage detection circuit 704 and a capacitive mode judge circuit 705. The voltage detection circuit 704 comprises a first voltage divider 741 and a second voltage divider 742. The first voltage divider 741 comprises resistors R1, R2 and R3. The first resistor R1 has a first terminal and a second terminal, wherein the first terminal is coupled to the first terminal S+ of the secondary winding. The second resistor R2 has a first terminal and a second terminal, wherein the first terminal is coupled to the second terminal of the first resistor R1, the second terminal is coupled to the first terminal of the output capacitor Co. The third resistor R3 has a first terminal and a second terminal, wherein the first terminal is couple to the second terminal of the first resistor R1, the second terminal is coupled to the secondary ground. The first voltage divider 741 provides the voltage detection signal $V_{S1}$ at the first terminal of the second resistor R2. The second voltage divider 742 is coupled in parallel with the output capacitor Co and comprises a fourth resistor R4 and a fifth resistor R5, the connection of which is shown in FIG. 10. The second voltage divider 742 provides the voltage detection threshold $V_{th}$ at its output terminal. In one embodiment, the resistance of the first resistor R1 and the second resistor R2 are equal, the resistance of the third resistor R3 and the fifth resistor R5 are equal, the resistance of the fourth resistor R4 is half of that of the first resistor R1. In other embodiments, the above resistors have other appropriate relationships. The first voltage divider 741 is configured to detect the voltage of the secondary winding and provide a DC voltage detection signal $V_{S1}$ with the amplitude of K1*Vo, wherein K1 is the division factor of the first voltage divider 741. The voltage detection threshold $V_{th}$ is set to a small signal that is slightly higher than zero. In one embodiment, the voltage detection threshold $V_{th}$ is set to 0.05*K1*Vo, wherein 0.05*K1 equals the division factor of the second voltage divider 742.

The resonant converter 700 with the series resonant network 702 has two types of operation: (1) the switching frequency is higher than the resonant frequency $f_r$; (2) the switching frequency is lower than the resonant frequency $f_r$.

In the embodiment shown in FIG. 10, the capacitive mode judge circuit 705 is designed to compare the voltage detection signal $V_{S1}$ with the voltage detection threshold $V_{th}$ when the high-side switch M1 is turned OFF. The judge law is: if the voltage detection signal $V_{S1}$ is larger than the voltage detection threshold $V_{th}$, the flag signal MC provided by the capacitive mode judge circuit has a first level and indicates the resonant converter 700 works in the inductive mode. Otherwise the voltage detection signal $V_{S1}$ is less than the voltage detection threshold $V_{th}$, the flag signal MC has a second level, indicates the resonant converter 700 works in the capacitive mode.

Figure 11A:
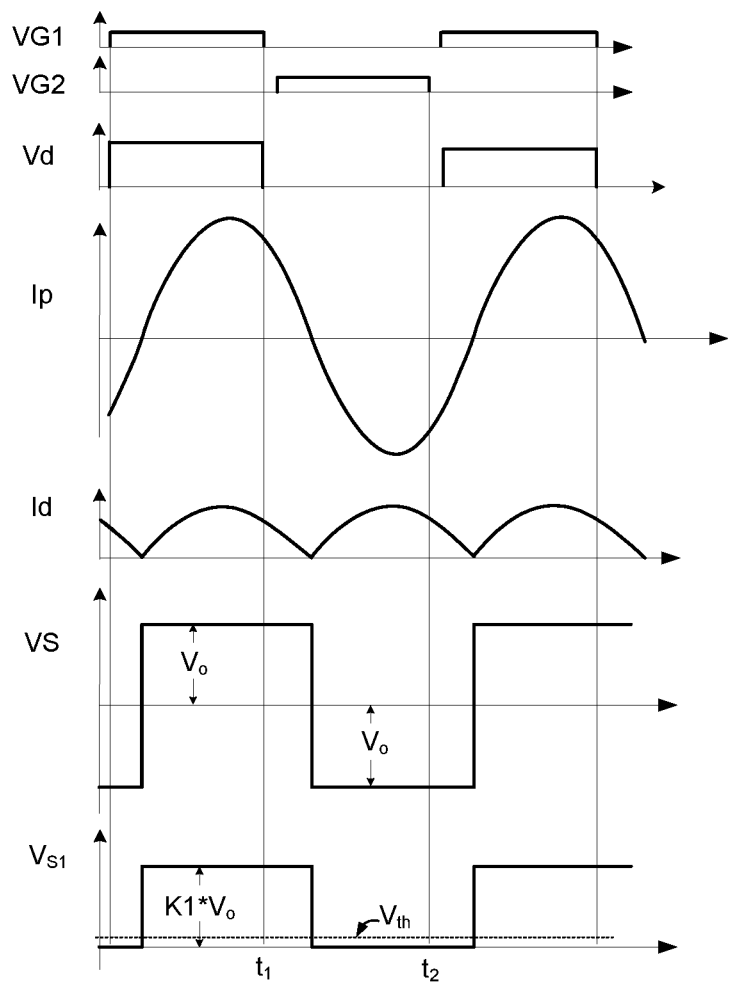
FIGS. 11A and 11B illustrate working waveform diagrams for the resonant converter 700 shown in FIG. 10 under different operation types, according to an embodiment of the present invention.
Figure 11B:
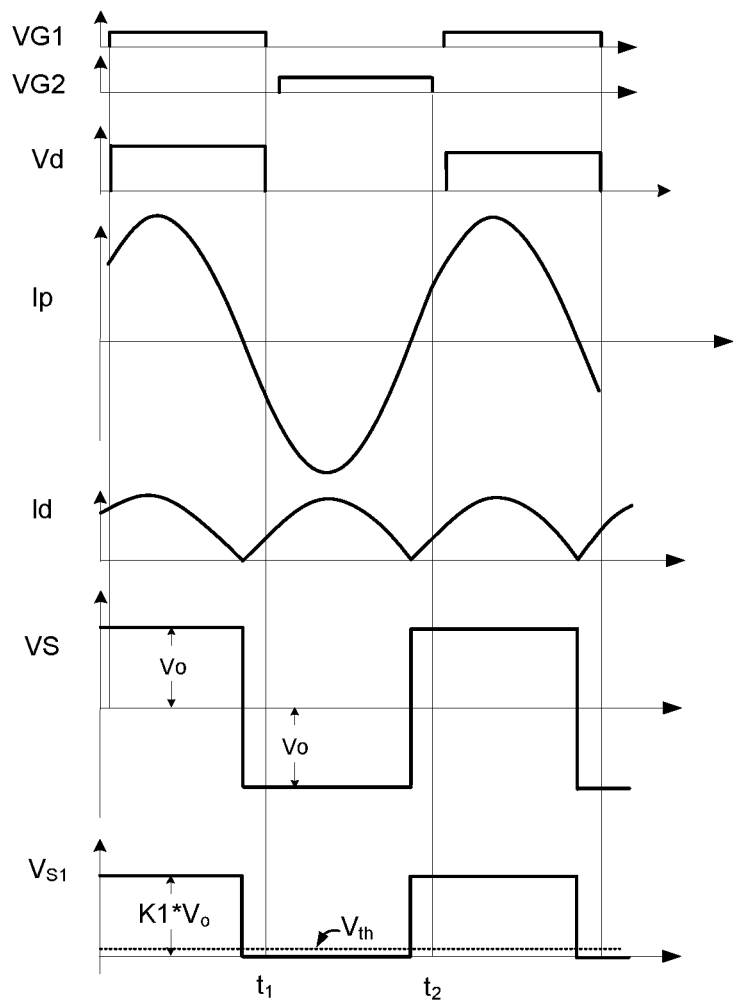

FIGS. 11A and 11B illustrate working waveform diagrams for the resonant converter 700 shown in FIG. 10 under different operation types, according to an embodiment of the present invention. In detail, FIGS. 11A and 11B illustrate in turn the waveforms of the first control signal VG1, the second control signal VG2, the square wave signal Vd, the primary input current Ip, the secondary input current Id, the voltage $V_S$ of the secondary winding and the voltage detection signal $V_{S1}$ respectively, in different operation types.

In detail, as shown in FIG. 11A, the switching frequency of the resonant converter 700 is higher than the resonant frequency $f_r$, the primary input current Ip lags the square wave signal Vd, the resonant converter 700 works in the inductive mode. According to the previous judge law, the voltage detection signal $V_{S1}$ is larger than the voltage detection threshold $V_{th}$ when the high-side switch is turned OFF, and the flag signal MC has the first level.

As shown in FIG. 11B, the switching frequency of the resonant converter 700 is lower than the resonant frequency $f_r$. The primary input current Ip leads the square wave signal Vd, the resonant converter 700 works in the capacitive mode. According to the previous judge law, the voltage detection signal $V_{S1}$ is less than the voltage detection threshold $V_{th}$ when the high-side switch M1 is turned OFF, and the flag signal MC has the second level.

Figure 12:
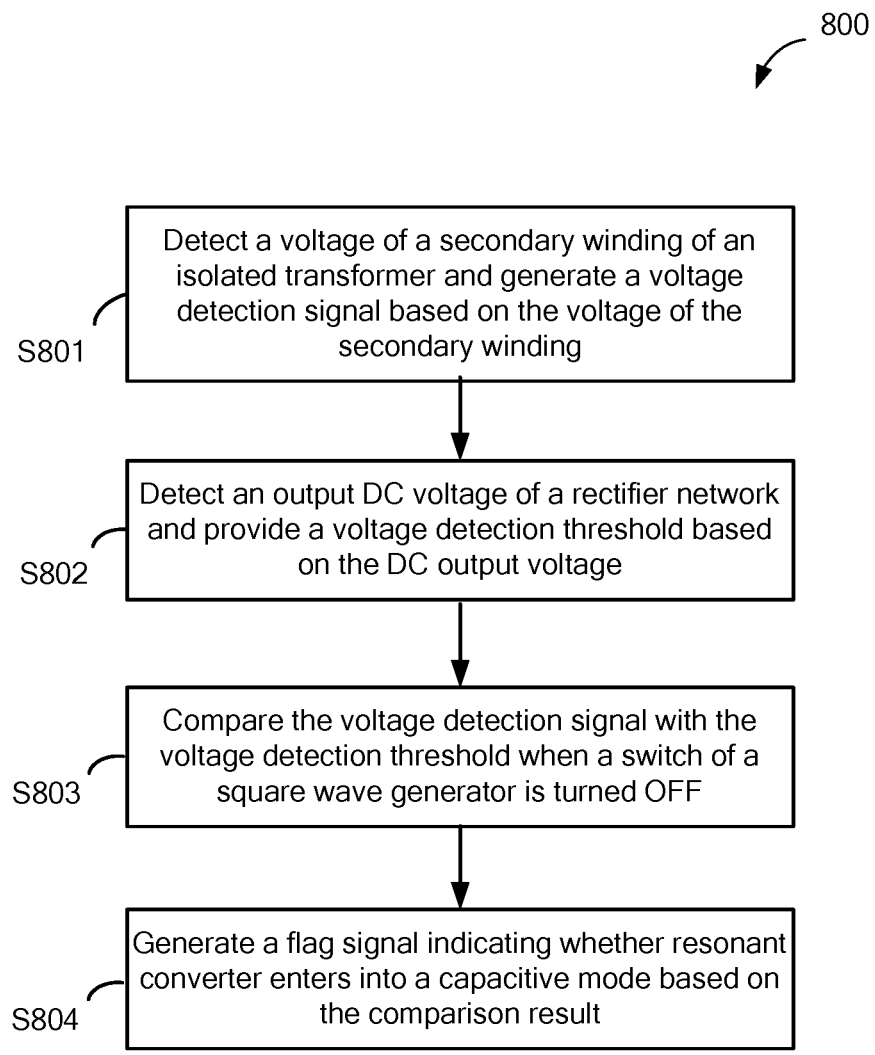
FIG. 12 illustrates a working-flow diagram of a method 800 of capacitive mode detection used in a resonant converter according to an embodiment of the present invention.

FIG. 12 illustrates a working-flow diagram of a method 800 of capacitive mode detection used in a resonant converter according to an embodiment of the present invention. The resonant converter comprises a square wave generator having a first switch and a second switch, a resonant network, an isolated transformer having a primary winding and a second winding, and a rectifier network configured to provide an output DC voltage for a load, the method of capacitive mode detection comprises steps S801~S804.

At step S801, a voltage of the secondary winding is detected and a voltage detection signal is generated based on the voltage of the secondary winding.

At step S802, an output DC voltage is detected and a voltage detection threshold is generated based on the output DC voltage.

At step S803, the voltage detection signal is compared with the voltage detection threshold when either of the first switch and the second switch is turned OFF.

At step S804, based on comparison result, a flag signal indicating whether the resonant converter enters into a capacitive mode is generated.

In detail, the secondary winding has a first terminal and a second terminal. In one embodiment, the voltage of the secondary winding comprises the voltage of the first terminal. In another embodiment, the voltage of the secondary winding comprises the difference between the voltage of the first terminal and second terminal of the secondary winding.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What we claim is:

1. A resonant converter, comprising:
   a square wave generator having a first switch and a second switch, wherein the first switch and the second switch are controlled by a first control signal and a second control signal respectively, the square wave generator is configured to convert an input direct current (DC) voltage into a square wave signal according to switching operations of the first switch and the second switch;
   a resonant network coupled to the square wave generator to receive the square wave signal;
   an isolated transformer having a primary winding and a secondary winding, wherein the primary winding is coupled to the resonant network, the secondary winding has a first terminal and a second terminal;
   a rectifier network coupled to the secondary winding and configured to provide an output DC voltage for a load at its output terminal;
   a voltage detection circuit coupled to the secondary winding to detect a voltage of the secondary winding and configured to provide a voltage detection signal based on the voltage of the secondary winding, the voltage detection circuit is further coupled to the output terminal of the rectifier network to receive the output DC voltage and provides a voltage detection threshold based on the output DC voltage;

a capacitive mode judge circuit coupled to the voltage detection circuit to receive the voltage detection signal and the voltage detection threshold, wherein the capacitive mode judge circuit is configured to compare the voltage detection signal with the voltage detection threshold at either of the first and the second switches is turned OFF and generates a flag signal indicating whether the resonant converter enters into a capacitive mode based on the comparison result; and a switching frequency controller configured to generate the said first and second control signals and coupled to the capacitive mode judge circuit to receive the flag signal, wherein the switching frequency controller is configured to increase the frequency of the first and the second control signals when the resonant converter enters into the capacitive mode.

2. The resonant converter of claim 1, wherein the voltage of the secondary winding comprises the voltage of the first terminal of the secondary winding.

3. The resonant converter of claim 1, wherein the voltage of the secondary winding comprises the difference between the voltage of the first terminal and second terminal of the secondary winding.

4. The resonant converter of claim 1, wherein the square wave generator is built as a full-bridge type.

5. The resonant converter of claim 1, wherein the r square wave generator is built as a half-bridge type.

6. The resonant converter of claim 1, wherein the resonant network comprises a capacitor, a first inductor and a second inductor, wherein the second inductor is coupled to the primary winding in parallel.

7. The resonant converter of claim 1, wherein the resonant network comprises a capacitor and a first inductor, wherein the capacitor, the first inductor and the primary winding are connected in series.

8. The resonant converter of claim 1, wherein the rectifier network comprises:

a bridge rectifier circuit having four rectifying diodes, wherein the anode of a first rectifying diode and the cathode of a third rectifying diode are coupled to the first terminal of the second winding, the cathode of a second diode and the anode of the fourth rectifying diode are coupled to the second terminal of the secondary winding; and an output capacitor having a first terminal and a second terminal, wherein the first terminal is coupled to the cathode of the first rectifying diode and the cathode of the fourth rectifying diode, the second terminal is coupled to the anode of the second rectifying diode, the anode of the third rectifying diode and a secondary ground.

9. The resonant converter of claim 8, wherein the voltage detection circuit comprises:

a first voltage divider coupled in parallel between the first terminal of the secondary winding and the secondary ground and configured to provide the voltage detection signal at its output terminal; and a second voltage divider coupled to the output capacitor in parallel and configured to provide the voltage detection threshold at its output terminal.

10. The resonant converter of claim 1, wherein the secondary winding further comprises a center tap coupled to the secondary ground;

the rectifier network comprises:

a full-wave rectifier circuit comprises a first and a second rectifying diode, wherein the anode of the first rectifying diode is couple d to the first terminal of the first terminal of the secondary winding, the anode of the second rectifying diode is coupled to the second terminal of the secondary winding; and an output capacitor having a first terminal and a second terminal, wherein the first terminal is coupled to the cathode of the first rectifying diode and the cathode of the second rectifying diode, the second terminal is coupled to the secondary ground.

11. The resonant converter of claim 10, wherein the voltage detection circuit comprises:

a first voltage divider, comprising:

a first resistor having a first terminal and a second terminal, wherein the first terminal is coupled to the first terminal of the secondary winding;

a second resistor having a first terminal and a second terminal, wherein the first terminal is coupled to the second terminal of the first resistor, the second terminal is coupled to the first terminal of the output capacitor;

a third resistor having a first terminal and a second terminal, wherein the first terminal is coupled to the second terminal of the first resistor, the second terminal is coupled to the secondary ground, the first voltage divider provides the voltage detection signal at the first terminal of the second resistor; and a second voltage divider coupled to the output capacitor in parallel and configured to provide the voltage detection threshold at its output terminal.

12. The resonant converter of claim 1, wherein the capacitive mode judge circuit comprises:

a first comparator having a non-inverting input terminal, an inverting input terminal and an output terminal, wherein the non-inverting input terminal is configured to receive the voltage detection threshold, the inverting input terminal is configured to receive the voltage detection signal, the first comparator provides a first comparison signal at the output terminal;

a first inverter having an input terminal and an output terminal, wherein the input terminal is coupled to receive the first control signal; and a first rising edge D flip-flop having an input reference terminal, an input clock terminal and an output terminal, wherein the input reference terminal is configured to receive the first comparison signal, the input clock terminal is coupled to the output terminal of the first inverter, the first rising edge D flip-flop provides the flag signal at the output terminal.

13. The resonant converter of claim 1, wherein the capacitive mode judge circuit comprises:

a second comparator having a non-inverting input terminal, an inverting input terminal and an output terminal, wherein the non-inverting input terminal is configured to receive the voltage detection signal, the inverting input terminal is configured to receive the voltage detection threshold, the second comparator provides a second comparison signal at the output terminal;

a second inverter having an input terminal and an output terminal, wherein the input terminal is coupled to receive the second control signal; and a second rising edge D flip-flop having an input reference terminal, an input clock terminal and an output terminal, wherein the input reference terminal is configured to receive the second comparison signal, the input clock terminal is coupled to the output terminal of the second inverter, the second rising edge D flip-flop provides the flag signal at the output terminal.

14. A capacitive mode detection circuit used in a resonant converter, the resonant converter comprises a square wave generator having a first switch and a second switch, a resonant network, an isolated transformer having a primary winding and a second winding, and a rectifier network configured to provide an output DC voltage for a load, the capacitive mode detection circuit comprises:
   a voltage detection circuit coupled to the secondary winding to detect a voltage of the secondary winding and configured to provide a voltage detection signal based on the voltage of the secondary winding, the voltage detection circuit is further coupled to the output terminal of the rectifier network to receive the output DC voltage and provides a voltage detection threshold based on the output DC voltage; and
   a capacitive mode judge circuit coupled to the voltage detection circuit to receive the voltage detection signal and the voltage detection threshold, wherein the capacitive mode judge circuit is configured to compare the voltage detection signal with the voltage detection threshold when either of the first and the second switches is turned OFF and generates a flag signal indicating whether the resonant converter enters into a capacitive mode based on the comparison result.

15. The capacitive mode detection circuit of claim 14, wherein the secondary winding has a first terminal and a second terminal, and the voltage of the secondary winding comprises the voltage of the second terminal of the secondary winding.

16. The capacitive mode detection circuit of claim 14, wherein the secondary winding has a first terminal and a second terminal, the voltage of the secondary winding comprises the difference between the voltage of the first terminal and the second terminal of the secondary winding.

17. A method of capacitive mode detection used in a resonant converter, the resonant converter comprises a square wave generator having a first switch and a second switch, a resonant network, an isolated transformer having a primary winding and a second winding, and a rectifier network configured to provide an output DC voltage for a load, the method comprises:
   detecting a voltage of the secondary winding and generating a voltage detection signal based on the voltage of the secondary winding;
   detecting an output DC voltage of the rectifier network and generating a voltage detecting threshold based on the output DC voltage;
   comparing the voltage detection signal with the voltage detection threshold when either of the first and the second switches is turned OFF; and
   generating a flag signal indicating whether the resonant converter enters into a capacitive mode based on the comparison result.

18. The method of claim 17, wherein the secondary winding has a first terminal and a second terminal, and the voltage of the secondary winding comprises the voltage of the first terminal of the secondary winding.

19. The method of claim 17, wherein the secondary winding has a first terminal and a second terminal, the voltage of the secondary winding comprises the difference between the voltage of the first terminal and second terminal of the secondary winding.

* * * * *